May 8, 1934. V. A. KJÆR 1,958,148
DEVICE FOR COUNTERBALANCING OR DIMINISHING THE VIBRATIONS OCCURRING
IN THE STATIONARY PARTS OF ENGINE PLANTS AND THE LIKE
Filed March 14, 1930 4 Sheets-Sheet 1
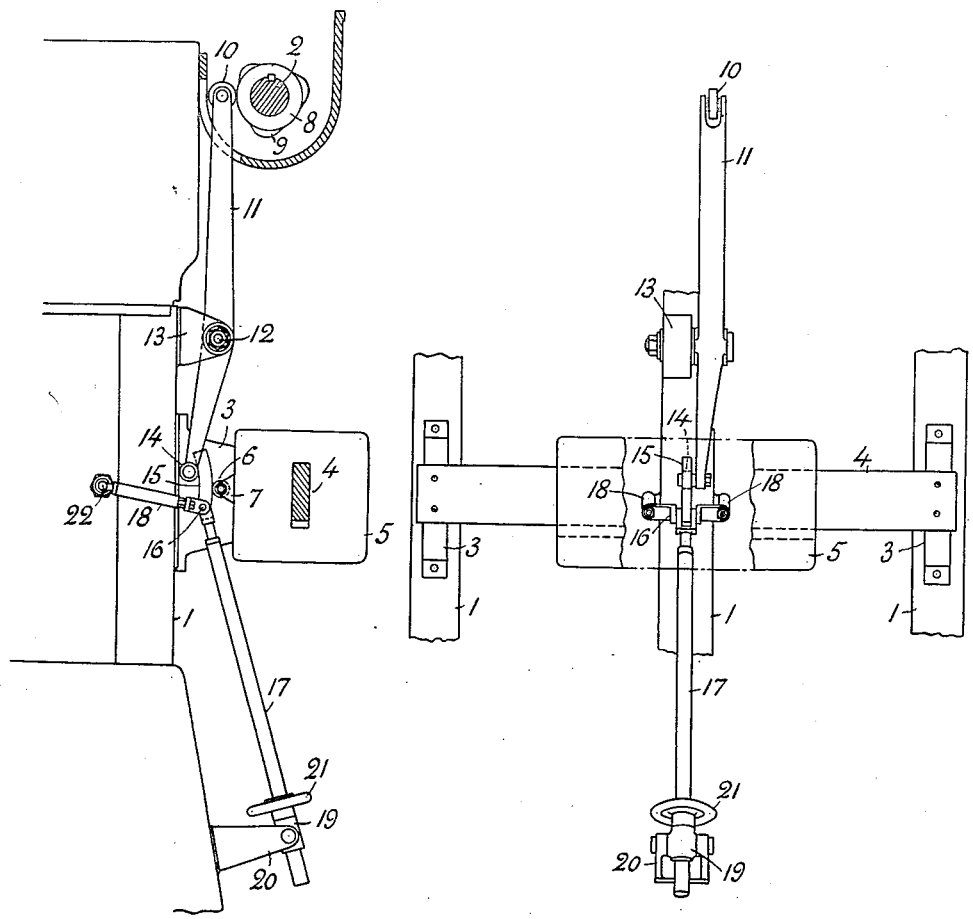
V. A. Kjaer
INVENTOR
By Marks & Clark
ATTYS.

May 8, 1934. V. A. KJÆR 1,958,148
DEVICE FOR COUNTERBALANCING OR DIMINISHING THE VIBRATIONS OCCURRING
IN THE STATIONARY PARTS OF ENGINE PLANTS AND THE LIKE
Filed March 14, 1930 4 Sheets-Sheet 2

May 8, 1934.  V. A. KJÆR  1,958,148
DEVICE FOR COUNTERBALANCING OR DIMINISHING THE VIBRATIONS OCCURRING
IN THE STATIONARY PARTS OF ENGINE PLANTS AND THE LIKE
Filed March 14, 1930  4 Sheets-Sheet 4

V. A. Kjaer, INVENTOR

By: Marks & Clerk
ATTYS.

Patented May 8, 1934

1,958,148

UNITED STATES PATENT OFFICE 1,958,148

DEVICE FOR COUNTERBALANCING OR DIMINISHING THE VIBRATIONS OCCURRING IN THE STATIONARY PARTS OF ENGINE PLANTS AND THE LIKE

Viggo Axel Kjær, Copenhagen, Denmark

Application March 14, 1930, Serial No. 435,981
In Denmark April 17, 1929

9 Claims. (Cl. 123—192)

The invention relates to a device for counterbalancing or diminishing the vibrations occurring in the stationary parts of engine plants and the like, as e. g. power plants, machines, ships &c. In internal combustion engines e. g. vibrations or periodical oscillations occur as a result of the reciprocating masses (piston, connecting rod, cross head &c.). The inertia forces with which the said reciprocating masses influence the frame and bases of the engine may be approximately expressed by the equation $$P = A \cos v + B \cos 2v,$$

where A and B are constants, while $v$ is the angle of rotation. In this equation the term $A \cos v$ represents forces of the first order, while the term $B \cos 2v$ represents forces of the second order, and as will be seen these forces vary according to sinus curves (cosinus curves). The forces of the first order which oscillate in time with the revolutions of the engine, as appears from the equation, are counterbalanced in the well known manner by means of counterweights placed on the crank shaft. The forces of the second order, which is seen to oscillate with a period twice as fast, are not counter-balanced by such counterweights, but particular measures must be taken, in order to counteract these forces, and this is one object of the invention. As another example may be mentioned the vibrations effected by the guide pressures of the cross head of a multicylinder piston engine. In a multicylinder engine a portion of the periodical forces harmonizing with the guide pressures and being of a comparatively low order will in many cases counterbalance each other, while the harmonic forces of comparatively high orders will not cause vibrations of any importance, so that generally it will only be necessary to counterbalance vibrations caused by harmonic forces of one particular order. As an example may be mentioned the particulars in a six-cylinder four-stroke internal combustion engine having a crank shaft of ordinary design. Here the sums of the harmonic forces of the orders from ½–2½ for all cylinders will counterbalance each other, whereas the forces of the third order will be added, while forces of higher orders will either counterbalance each other or be of so high period that they are without importance. Consequently, in this case only forces of the third order produce vibrations, and these forces are harmonic periodical forces varying according to a simple sinusoidal curve.

As a third example may be mentioned the vibrations rising in propeller ships owing thereto that the bearing presures in the sternpost vary during the rotation of the propeller or propellers, the reaction on the propeller blades in a plane perpendicular to the propeller shaft or shafts varying in value and direction. Also in this case the forces in question are periodical forces harmonizing with the varying bearing reaction components producing the vibrations. The device according to the invention, which has—as above stated—for its object to counterbalance or diminish the vibrations of which examples are given above, is of that kind, in which masses, as e. g. blocks or the like, are arranged in combination with the vibrating stationary parts of the plant, said masses being proportioned relatively to the dimensions of the vibrating parts and vibrations and being set in oscillating motions serving to counteract or counterbalance the vibrations. The invention is characterized thereby, that the masses constitute an oscillatory system the natural frequency of which is wholly or approximately equal to the frequency of the harmonic forces producing the vibrations, and that the oscillating motion of the said masses is controlled in such manner, e. g. by the moving parts of the plant itself by cranks, eccentrics, cams or the like, that it is secured, that the masses are set in oscillations, the frequency of which is identic with the frequency of the harmonic forces producing the vibrations to be counterbalanced, and the phase of which is wholly or approximately opposite to the vibrations. Preferably the amplitudes of the oscillations imparted to the said masses are then so great that thereby the vibrating stationary parts of the engine plant are exposed to impulses wholly or approximately of the same dimensions as the impulses producing the vibrations. The masses are attached to the vibrating stationary parts of the engine plant by elastic connections. It is a practical measure to employ adjusting means by which the amplitude of the oscillating system of masses may be varied, or the phase of the oscillations may be displaced. An adequate measure is also to insert an elastic member in the device controlling the oscillating motion of the oscillating system. The invention is illustrated in the drawings in three different constructional forms. Fig. 1 is a side elevation of a constructional form serving to counterbalance the vibrations resulting from the guide pressures in an internal combustion engine, Fig. 2 is a front elevation of the same, Fig. 3 is a sectional elevation of a constructional form serving to counterbalance the vibrations produced by the reciprocating masses in an internal combustion engine, Fig. 4 is a side elevation thereof, and Fig. 5 is a side elevation, partly in section, of a constructional form serving to counterbalance in ships the vibrations produced by reactions from the propellers of the ship.

Figure 3:
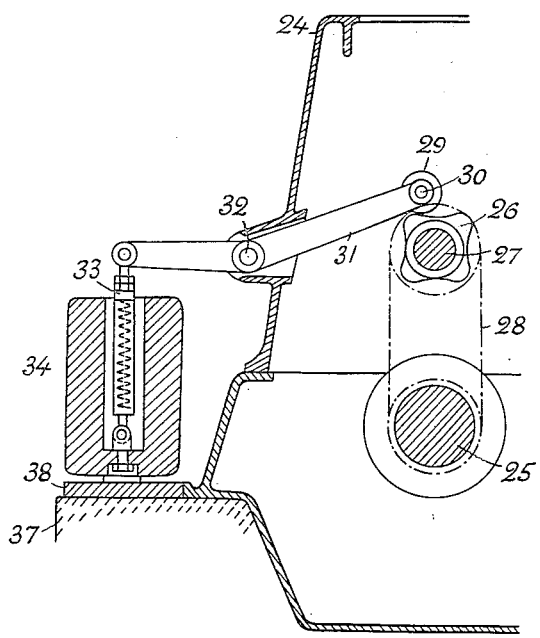
Figure 4:
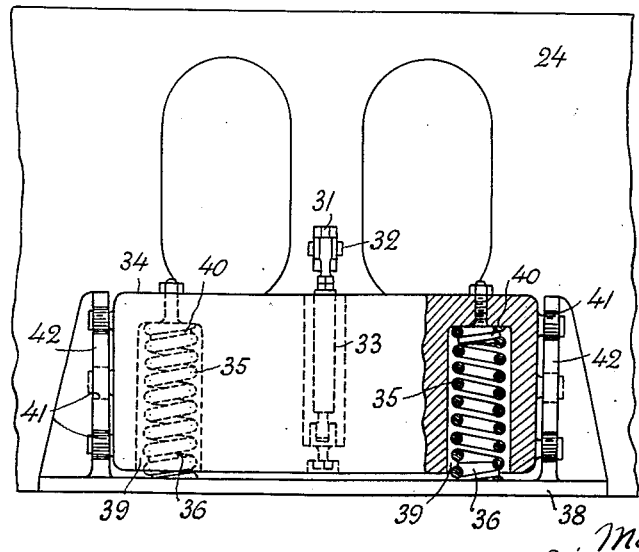
Figure 5:
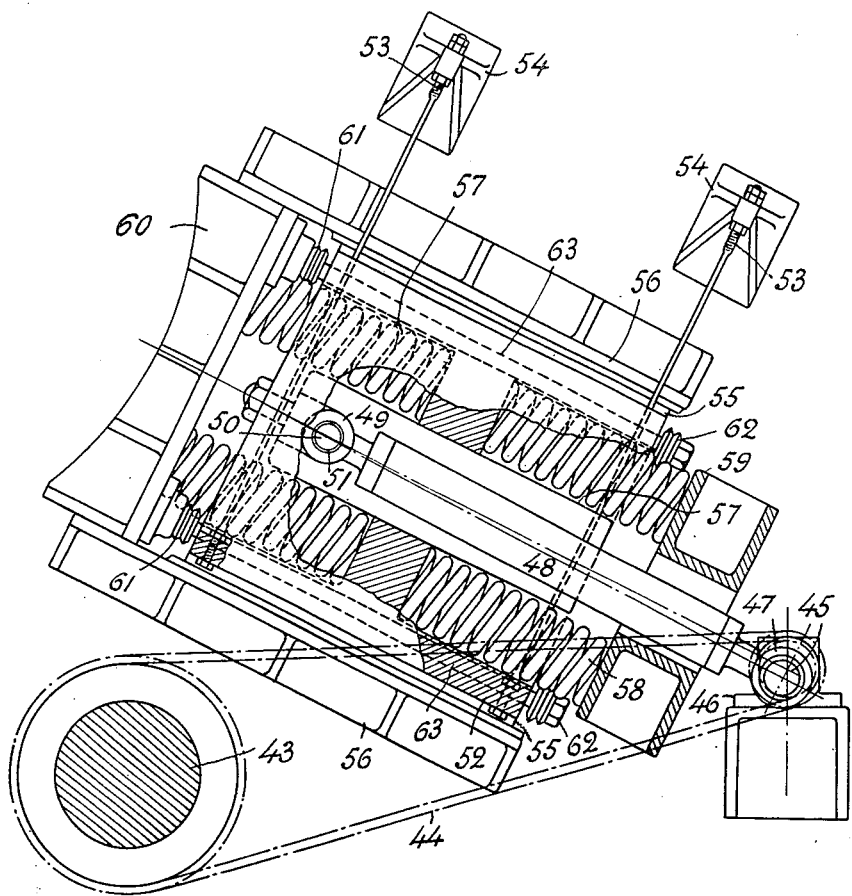
Figure 6:
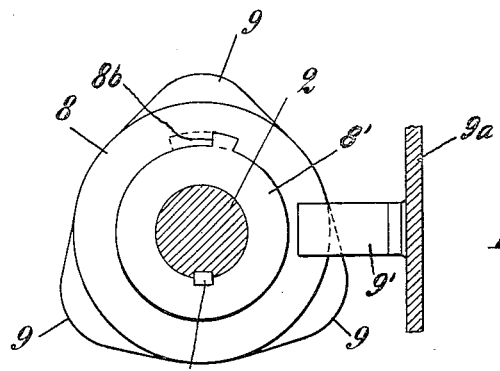
Fig. 6 is a detail side elevation showing the cam adjustment.
Figure 7:
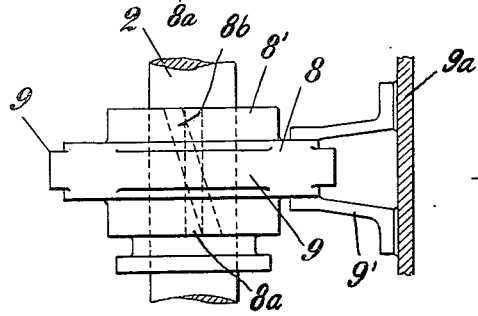
Fig. 7 is a top plan view thereof.

Figs. 6 and 7 show the cam disc 8 of Fig. 1 provided with means for adjusting the cams 9 relatively to the shaft 2, by which adjustment it is possible to obtain that the oscillations transmitted to the block 5 lie in a phase opposite to the harmonic impulses effected by the guide pressure. The cam disc 8 is rotatably mounted upon the block 8' secured to the shaft 2 by means of the key 8a, 8b indicates the helical key constituting the connection between the block 8' and the cam disc 8. The latter is enclosed between the prongs of the fork 9', which is displaceable along the guide 9a, and by displacing said fork 9' the cam disc 8 is turned an angle relatively to the shaft 2. In Figs. 1 and 2, 1 is the frame of a multi-cylinder four-stroke cycle internal combustion engine, and 2 is its cam shaft. To the frame 1 are secured consols 3 carrying a steel beam 4 with a flat rectangular cross section, this steel beam being so mounted as to yield to horizontal forces. On the steel beam 4 is hung a heavy cast iron block 5 carrying a roller 6 in bearings 7 on that side facing the frame. The cam shaft 2 carries a cam disc 8 with three cams 9 and coacting with a cam roller 10 rotatably mounted in a fork at one end of a two-armed lever 11, which is pivoted on a pin 12 carried by a bearing 13 fixed to the frame 1. At its lower end the lever 11 carries a cam roller 14 engaging a curved link 15 with which also the roller 6 coacts. A pin 16 connects the link 15 pivotally with a controlling rod 17 and links 18. The rod 17 is threaded at its lower end and provided with a nut having a hand wheel 21 and being guided in a sleeve mounted in a bearing 20 fixed to the frame 1. The links 18 are pivotally connected with the frame 1 by pins 22. The device is so mounted that the steel beam 4, which is—as stated above—yieldingly mounted in a horizontal direction, has a small pre-tension keeping the roller 6 pressed against the feebly curved link 15. The latter is hereby pressed against the roller 14 of the lever 11, and consequently the cam roller 10 is kept pressed against the cam disc 8 on the cam shaft 2. The device acts as follows. During the running of the engine the cams 9 of the cam disc 8 pass the cam roller 10 so that each revolution of the cam shaft 2 imparts three oscillations in both directions to the lever 11, and these oscillations are transmitted through the roller 14, link 15 and roller 6 to the block 5, which is thereby set into oscillations together with the steel beam 4. The cams 9 of the cam disc 8 are so placed that the oscillations transmitted to the block 5 lie just in a phase opposite to that of the harmonic impulses effected by the guide pressures and producing the vibrations to be counterbalanced. If variations occur in the load of the engine, it may be necessary to change the amplitudes of the oscillations of the block 5, the value of the impulses of the vibrations arising from the guide pressures varying with the load of the engine. Such variations in the amplitudes of the block 5 may be obtained by rotating the hand wheel 21, this motion displacing the rod 17 and therewith also the pivot 16 of the link 15 up or down. The amplitude of the oscillations of the block 5 produced by the oscillations of the roller 6, which oscillations have a constant amplitude, depends, namely, of the position of the pin 16 relatively to the rollers 14 and 6, as the link 15 may be considered as a lever of the second order acted upon at a certain distance from its pivot by the roller 14 and delivering this action at another distance from the pivot to the roller 6. When the load of the engine varies, not only the amplitudes of the vibrations but also their phase will generally vary in an internal combustion engine. In this case the phase of the oscillations of the block 5 may either be laid opposite to the average phase of the oscillations at full load and no-load respectively, or special devices may be employed, by means of which the phase of the oscillating mass by all loads may be adjusted to precisely oppose the phase of the vibrations. Such alterations of the phase may be carried out in many ways. For instance a displacement of the phase may be obtained by some adjusting device by which the cam disc 8 may be displaced relatively to the cam shaft so as indicated in Figs. 5 and 6. In order to prevent overload of the individual parts of the system through which the oscillating motion is transferred to the oscillating system 4, 5 by starting or stopping, an elastic member is preferably inserted therein. In the specified construction e. g. the links 18 may be springy. In the constructional form shown in Figs. 3 and 4, 24 is a part of the frame and 25 the main shaft of the engine. 26 is a cam disc rotatably mounted on a stationary pin 27 in the frame and moved from the shaft 25 by a chain 28. The cam disc 26 has four cams and engages a cam roller 29 pivotally mounted on a pin 30 in a fork at one end of a two-armed lever 31, the stationary pivot 32 of which is mounted in the frame 24. The other end of the lever 31 is connected by an elastic link 33 with a heavy block 34, which rests on two strong helical springs 35, Fig. 4, the lower ends of which are connected by spring guides 36 to a base plate 38 bolted to the engine foundation 37. The springs 35 are located in cavities 39 in the block 34 and connected therewith at their tops by spring guides 40. The block 34 is guided by rollers 41, Fig. 4, running on both sides of guides 42, which form upright parts of the base plate 38. The device acts as follows. During the running of the engine the cam disc 26 receives its motion from the main shaft 25 by means of the chain 28, whereby the lever 31 is given four oscillations at each revolution of the cam disc, the cam roller 29 patting over the cams of the disc 26. The oscillations of the lever 31 are transferred through the link 33 to the block 34 which is thus caused to oscillate vertically, guided during its motion by the rollers 41 and guides 42. The mutual displacement of the cam disc 26 and the crank shaft 25 is so adjusted that the oscillations of the block 34 have just the same frequency as the harmonic impulses arising from the inertia impulses causing the vibrations of the engine frame, basis and other stationary parts. The amplitude of the oscillations of the block 34 are further so adjusted that the impulses arising from this oscillating system are not only oppositely directed to the impulses producing the vibrations but are also equal in force to these vibrations, whereby is obtained that the vibrations are made to cease. This adjustment may be performed in a manner corresponding to that shown in Figs. 6 and 7.

By this constructional form—as also is the case for the constructional form according to Figs. 1 and 2—the oscillating system (block 34 and springs 35) is so adjusted that the natural frequency of the system is equal to the frequency of the vibrations, it being thus possible to control the motion of the oscillating system with a minimum of energy. Overload of the device during start is prevented in a similar manner as stated in connection with Figs. 1 and 2 by inserting a spring member, in this case the elastic link 33. According to Fig. 5, 43 is the propeller shaft of a ship, 44 a chain driving a shaft 45 mounted in the bearings 46 from the propeller shaft.

Figure 8:
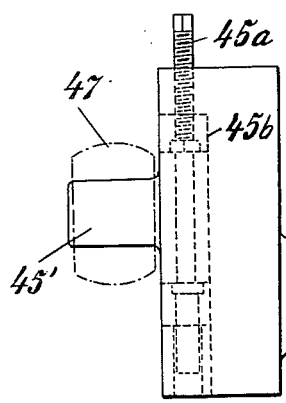
Fig. 8 is a detail side view of the head adjusting means.
Figure 9:
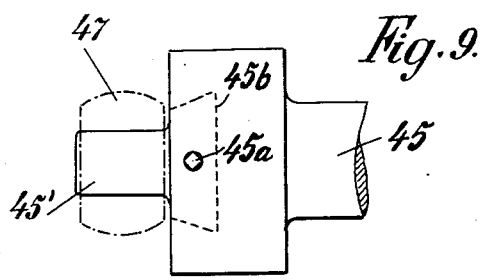
Fig. 9 is a top plan view of the same.

The shaft 45 is provided with a crank surrounded by the head 47 of a link 48. Preferably the latter is springy in a similar manner as the links 18 and 33 in the above described constructional forms. The other head 49 of the link is connected by a pin 50 with a bearing 51 in a cast iron block 52 hung by flat steel bands 53 or the like in stationary brackets 54. The block 52 is guided by plane parallel guiding surfaces 55 on stationary rails 56. This manner of suspending and guiding the block 52 permits it a slight reciprocating motion. 58 are heavy helical springs, four in number, placed in cavities 57 in the block 52 and bearing with their ends against the bottom of the cavities 57 and against stationary spring guides or brackets 59, 60. Spring buffers 61, 62 limit the oscillating motion of the block 52 at the top and bottom of long bolts 63 passing through cavities in the block 52. As appears from the drawings, the block 52 is inclined, and this inclination is determined in accordance with the resulting reactions on the stern bearing of the vessel arising from the pressure of the water against the propeller. The gearing ratio for the chain 44 between the propeller shaft 43 and shaft 45 and the mutual displacement of these shafts are so adjusted that the reciprocatory oscillations imparted to the block 52 during the rotation of the propeller have just the same frequency as the reactions produced by the pressure of the propeller against the water, but are oppositely directed thereto. Besides taking care that the oscillations of the block 52 get the same frequency as the vibrations of the ship and a phase opposite thereto, and that the natural frequency of the oscillating system is in conformity with said frequency, I adjust preferably the amplitude of the oscillations so that the vibratory impulses on the vessel obtained hereby are equal to the vibratory impulses to be counterbalanced. This result is obtained as illustrated in Figs. 8 and 9 wherein the shaft 45 carries the crank 45' on which the head 47 is mounted. The crank 45' is adjustable by means of a screw 45a and a guide 45b. By such adjustment, the radius of the crank 45' may be varied. The invention is not bound to the constructional forms illustrated and described in this specification, which are only given by way of examples.

I claim:

1. In a device for counterbalancing engine plants including oscillatory masses adapted to be set into oscillation simultaneously with the movement of the engine, means for yieldably suspending the masses, mechanical controlling means for imparting oscillatory movement to the masses, said suspending means and masses being so mutually proportioned that the oscillatory system constituted thereby have a natural frequency which is substantially in resonance with the period of movement of the said controlling means setting the masses in oscillation.

2. A device according to claim 1 wherein the oscillatory masses rest on springs attached to a stationary part of the engine plant.

3. A device according to claim 1 wherein the controlling means includes a yieldable member.

4. A device according to claim 1 wherein the controlling means actuating the oscillatory masses comprise a yieldable member, the tension of which is such that it only yields to excessive stresses.

5. A device according to claim 1 having adjusting members for adjusting the controlling means.

6. The combination with an internal combustion engine including a cam shaft and frame, of a elastic beam supported by the frame, a block weight suspended on the beam, and means operable by the cam shaft for imparting oscillatory movement to the weight during rotation of the cam shaft.

7. The combination with an internal combustion engine, including a frame and cam shaft, of a yieldably supported block weight mounted adjacent the frame, and means operable by the cam shaft for imparting oscillatory movement to the block, as and for the purpose set forth.

8. A device as claimed in claim 7, wherein the block weight is yieldably supported by helical springs.

9. The combination with an engine plant, of a block, inclined surfaces for guiding the block, means for suspending the block to permit reciprocation thereof along the inclined surface, helical springs for resisting the to and fro movement of the block, and means for imparting oscillatory movement to the block, as and for the purpose set forth.

VIGGO A. KJÆR.